United States Patent [19]
Burgess et al.

[11] Patent Number: 5,621,896
[45] Date of Patent: Apr. 15, 1997

[54] DATA PROCESSOR WITH UNIFIED STORE QUEUE PERMITTING HIT UNDER MISS MEMORY ACCESSES

[75] Inventors: David P. Burgess; Milton M. Hood, Jr.; Betty Y. Kikuta; Graham R. Murphy, all of Austin, Tex.

[73] Assignees: Motorola, Inc., Schaumburg, Ill.; International Business Machines Corp., Armonk, N.Y.

[21] Appl. No.: 523,313

[22] Filed: Sep. 5, 1995

Related U.S. Application Data

[63] Continuation of Ser. No. 252,473, Jun. 1, 1994, abandoned.

[51] Int. Cl.$^6$ .................................................. G06F 13/00
[52] U.S. Cl. .................. 395/250; 364/939.7; 364/239.8
[58] Field of Search .................................. 395/375, 775, 395/800, 250

[56] References Cited

U.S. PATENT DOCUMENTS

| | | | |
|---|---|---|---|
| 3,984,817 | 10/1976 | Barbour et al. | 395/600 |
| 4,229,790 | 10/1980 | Gilliland et al. | 395/775 |
| 4,354,232 | 10/1982 | Ryan | 395/425 |
| 4,507,760 | 3/1985 | Fraser | 365/221 |
| 5,043,870 | 8/1991 | Ditzel et al. | 395/459 |
| 5,179,671 | 1/1993 | Kelly et al. | 395/375 |
| 5,289,564 | 2/1994 | Morimoto et al. | 395/109 |
| 5,317,720 | 5/1994 | Stamm et al. | 395/470 |
| 5,333,296 | 7/1994 | Bouchard et al. | 395/497.02 |
| 5,335,326 | 8/1994 | Nguyen et al. | 395/250 |
| 5,386,514 | 1/1995 | Lary et al. | 395/250 |
| 5,469,558 | 11/1995 | Lieberman | 395/285 |
| 5,473,764 | 12/1995 | Chi | 395/375 |

*Primary Examiner*—David Y. Eng
*Attorney, Agent, or Firm*—Lee E. Chastain

[57] ABSTRACT

A store queue for use in a data processor (10) with a memory storage system has a first-in-first-out ("FIFO") queue (48) and control circuitry (52). The control circuitry maintains three pointers which index the entries in the FIFO queue: a dispatch pointer (D), a completion pointer (C), and an oldest miss pointer (OM). The control circuitry stores each stole instruction in the entry designated by the dispatch pointer and then increments the dispatch pointer. The control circuitry increments the completion pointer when the data processor indicates that the previously designated store instruction is the oldest instruction in the data processor: when the instruction is "completed." The control circuitry increments the oldest miss pointer after it presents the previously designated store instruction to the memory system.

6 Claims, 5 Drawing Sheets

| POINTERS | | | | ENTRY | VALID | INSTRUCTION | REAL ADDRESS | DATA | REMARKS |
|---|---|---|---|---|---|---|---|---|---|
| D | C | NA | OM | | | | | | |
| | | | | 0 | 0 | − | − | − | INVALID |
| | | | | 1 | 0 | − | − | − | INVALID |
| | | | | 2 | 0 | − | − | − | INVALID |
| | | | | 3 | 0 | − | − | − | INVALID |
| → | → | → | → | 4 | 0 | − | − | − | INVALID |
| | | | | 5 | 0 | − | − | − | INVALID |

FIG.5

| POINTERS | | | | ENTRY | VALID | INSTRUCTION | REAL ADDRESS | DATA | REMARKS |
|---|---|---|---|---|---|---|---|---|---|
| D | C | NA | OM | | | | | | |
| | | | | 0 | 0 | − | − | − | INVALID |
| | | | | 1 | 0 | − | − | − | INVALID |
| | | | | 2 | 0 | − | − | − | INVALID |
| | | | | 3 | 0 | − | − | − | INVALID |
| → | → | → | → | 4 | 0 | STORE A | − | − | INVALID |
| | | | | 5 | 0 | − | − | − | INVALID |

| POINTERS | | | | ENTRY | VALID | INSTRUCTION | REAL ADDRESS | DATA | REMARKS |
|---|---|---|---|---|---|---|---|---|---|
| D | C | NA | OM | | | | | | |
| | | | | 0 | 0 | – | – | – | INVALID |
| | | | | 1 | 0 | – | – | – | INVALID |
| →  | | | | 2 | 0 | – | – | – | INVALID |
| | →  | →  | →  | 3 | 0 | – | – | – | INVALID |
| | | | | 4 | 1 | STORE A | RA A | – | FINISHED |
| | | | | 5 | 0 | – | – | – | INVALID |

| POINTERS | | | | ENTRY | VALID | INSTRUCTION | REAL ADDRESS | DATA | REMARKS |
|---|---|---|---|---|---|---|---|---|---|
| D | C | NA | OM | | | | | | |
| | | | | 0 | 0 | – | – | – | INVALID |
| →  | | | | 1 | 0 | – | – | – | INVALID |
| | | | | 2 | 1 | STORE C | RA C | – | FINISHED |
| | | | | 3 | 1 | STORE B | RA B | – | FINISHED |
| | →  | →  | →  | 4 | 1 | STORE A | RA A | – | FINISHED |
| | | | | 5 | 0 | – | – | – | INVALID |

| POINTERS | | | | ENTRY | VALID | INSTRUCTION | REAL ADDRESS | DATA | REMARKS |
|---|---|---|---|---|---|---|---|---|---|
| D | C | NA | OM | | | | | | |
| | | | | 0 | 0 | – | – | – | INVALID |
| →  | | | | 1 | 0 | – | – | – | INVALID |
| | | | | 2 | 1 | STORE C | RA C | – | FINISHED |
| | →  | | | 3 | 1 | STORE B | RA B | – | FINISHED |
| | | →  | →  | 4 | 1 | STORE A | RA A | A | COMPLETED |
| | | | | 5 | 0 | – | – | – | INVALID |

| POINTERS | | | | ENTRY | VALID | INSTRUCTION | REAL ADDRESS | DATA | REMARKS |
|---|---|---|---|---|---|---|---|---|---|
| D | C | NA | OM | | | | | | |
| | | | | 0 | 0 | – | – | – | INVALID |
| →  | | | | 1 | 0 | – | – | – | INVALID |
| | | | | 2 | 1 | STORE C | RA C | – | FINISHED |
| | →  | →  | | 3 | 1 | STORE B | RA B | – | FINISHED |
| | | | →  | 4 | 1 | STORE A | RA A | A | ATTEMPTED |
| | | | | 5 | 0 | – | – | – | INVALID |

48

|  | POINTERS |  |  | ENTRY | VALID | INSTRUCTION | REAL ADDRESS | DATA | REMARKS |
|---|---|---|---|---|---|---|---|---|---|
| D | C | NA | OM |  |  |  |  |  |  |
|  |  |  |  | 0 | 0 | – | – | – | INVALID |
| → | → |  |  | 1 | 0 | – | – | – | INVALID |
|  |  |  |  | 2 | 1 | STORE C | RA C | C | COMPLETED |
|  | → |  |  | 3 | 1 | STORE B | RA B | B | COMPLETED |
|  |  | → |  | 4 | 1 | STORE A | RA A | A | ATTEMPTED |
|  |  |  |  | 5 | 0 | – | – | – | INVALID |

*FIG.11*

|  | POINTERS |  |  | ENTRY | VALID | INSTRUCTION | REAL ADDRESS | DATA | REMARKS |
|---|---|---|---|---|---|---|---|---|---|
| D | C | NA | OM |  |  |  |  |  |  |
|  |  |  |  | 0 | 0 | – | – | – | INVALID |
| → | → |  |  | 1 | 0 | – | – | – | INVALID |
|  |  | → |  | 2 | 1 | STORE C | RA C | C | COMPLETED |
|  |  |  |  | 3 | 0 | STORE B | RA B | B | HIT-UNDER-MISS |
|  | → |  |  | 4 | 1 | STORE A | RA A | A | ATTEMPTED |
|  |  |  |  | 5 | 0 | – | – | – | INVALID |

*FIG.12*

|  | POINTERS |  |  | ENTRY | VALID | INSTRUCTION | REAL ADDRESS | DATA | REMARKS |
|---|---|---|---|---|---|---|---|---|---|
| D | C | NA | OM |  |  |  |  |  |  |
|  |  |  |  | 0 | 0 | – | – | – | INVALID |
| → | → |  |  | 1 | 0 | – | – | – | INVALID |
|  |  | → | → | 2 | 1 | STORE C | RA C | C | COMPLETED |
|  |  |  |  | 3 | 0 | STORE B | RA B | B | INVALID |
|  |  |  |  | 4 | 0 | STORE A | RA A | A | INVALID |
|  |  |  |  | 5 | 0 | – | – | – | INVALID |

*FIG.13*

|  | POINTERS |  |  | ENTRY | VALID | INSTRUCTION | REAL ADDRESS | DATA | REMARKS |
|---|---|---|---|---|---|---|---|---|---|
| D | C | NA | OM |  |  |  |  |  |  |
|  |  |  |  | 0 | 0 | – | – | – | INVALID |
| → | → | → | → | 1 | 0 | – | – | – | INVALID |
|  |  |  |  | 2 | 0 | STORE C | RA C | C | INVALID |
|  |  |  |  | 3 | 0 | STORE B | RA B | B | INVALID |
|  |  |  |  | 4 | 0 | STORE A | RA A | A | INVALID |
|  |  |  |  | 5 | 0 | – | – | – | INVALID |

*FIG.14*

DATA PROCESSOR WITH UNIFIED STORE QUEUE PERMITTING HIT UNDER MISS MEMORY ACCESSES

This application is a continuation of prior application Ser. No. 08/252,473, filed on Jun. 1, 1994, entitled "DATA PROCESSOR WITH UNIFIED STORE QUEUE AND METHOD OF OPERATION", (original title) now abandoned.

FIELD OF THE INVENTION

The present invention generally relates to digital computing systems, and more specifically to store instructions.

BACKGROUND OF THE INVENTION

All data processors execute some instruction by which they move the results of their internal calculations to the remainder of the data processing system of which they are part. The results of these calculations may be moved to an external memory system for storage and later use, to a CRT for display to a human user, or to a network for transmission to another data processing system. These instructions are often referred to as "store" or "write" instructions. Store instructions typically share hardware resources with instructions that move data in the opposite direction, from the external system to the data processor, and with other specialized instructions. If two or more of these instructions occur at the same time, then the data processor must invoke some priority scheme to resolve the hardware resource conflict.

The development of modem data processors has lead to the priority of store instructions being placed second to almost any other type of internal-external instruction. For instance, most data processors execute load instructions before they execute store instructions. This priority role reflects the importance of bringing new instructions into the data processor for execution. Also, memory coherency protocol operations ("snoop operations") are executed before a store instructions. This priority rule reflects the importance of maintaining coherent data throughout the data processing system. As a consequence, store instructions often languish in internal buffers or queues while they wait to be executed after other, more senior, instructions.

The secondary priority of store instructions is not without drawbacks. Certain data processors, particularly reduced instruction set computers ("RISC"), finish executing instructions in an order different from the original program order. These data processors maintain certain information about each instruction to ensure that the data processor's architectural registers are modified in the program order. While a data processor waits to execute and ultimately complete a store instruction, it must dedicate certain of these resources to the store instructions. These resources can not be used for other instructions.

SUMMARY OF THE INVENTION

In accordance with the present invention, there is disclosed a store queue for use in a data processor with a memory system and method of operation which substantially eliminates disadvantages of known store instruction buffering systems and schemes.

The disclosed store queue has a first-in-first-out ("FIFO") queue and control circuitry. The control circuitry maintains three pointers which index the entries in the FIFO queue: a dispatch pointer, a completion pointer, and an oldest miss pointer. The control circuitry stores each store instruction in the entry designated by the dispatch pointer and then increments the dispatch pointer. The control circuitry increments the completion pointer when the data processor indicates that the previously designated store instruction is the oldest instruction in the data processor: when the instruction is "completed." The control circuitry increments the oldest miss pointer after it presents the previously designated store instruction to the memory system.

The disclosed method has the steps of, during a first time, storing one of the plurality of store instructions in a selected entry of a FIFO queue in the data processor and incrementing a dispatch pointer. The dispatch pointer indexes the selected entry. The method continues during a second time, when the store queue receives a signal from the data processor and increments a completion pointer. The signal is representative of the completion of the one of the plurality of store instructions. Finally, the method has the steps of presenting the one of the plurality of store instructions to a memory storage system and incrementing an oldest miss pointer.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
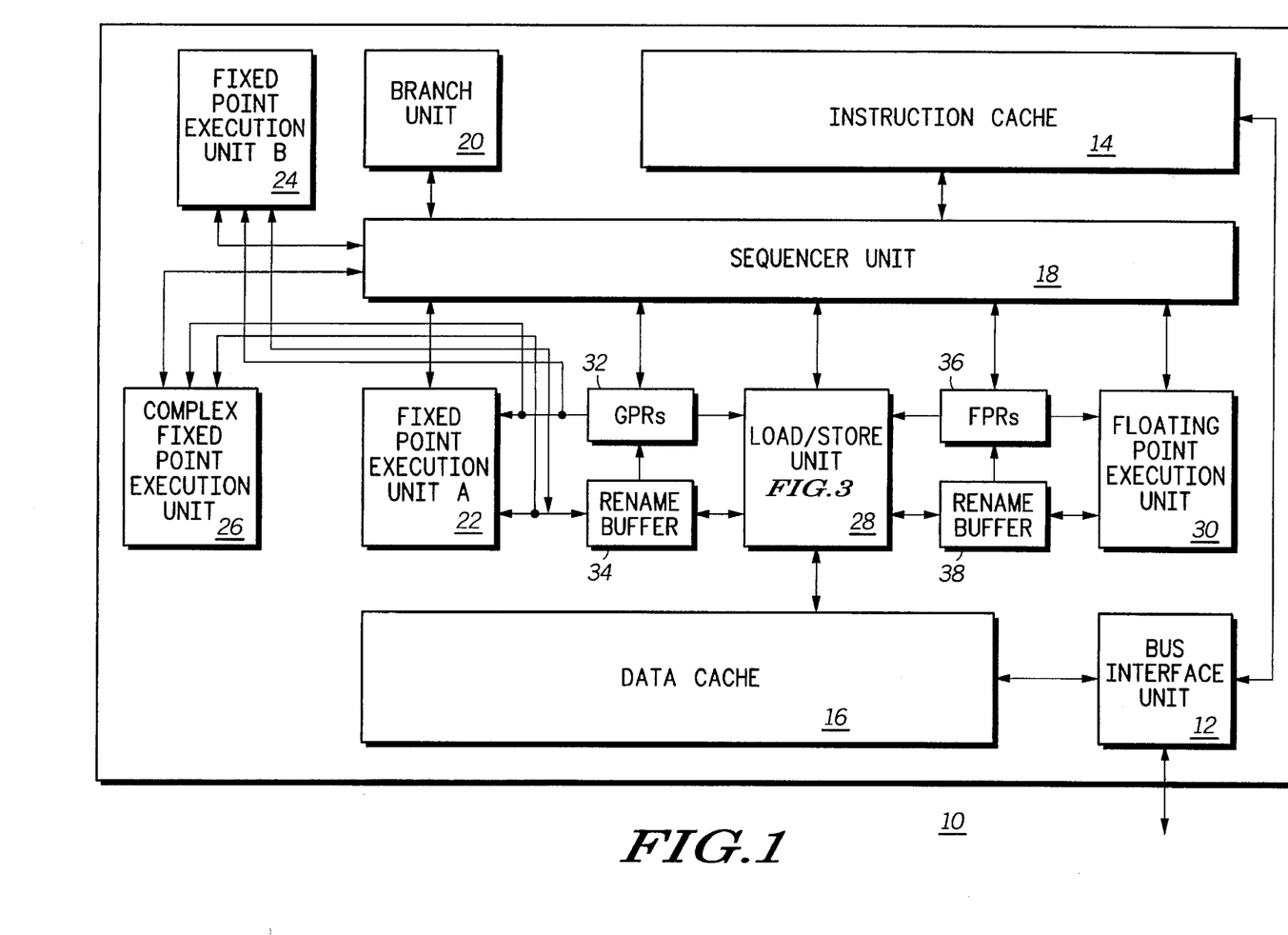
FIG. 1 depicts a block diagram of a data processor constructed in accordance with the present invention.

FIG. 1 depicts a block diagram of a data processor 10 constructed in accordance with the present invention. Data processor 10 prioritizes store instructions second to load instructions, memory coherency operations table walk instructions (specialized address translation operations), etc. However, data processor 10 does not maintain excessive resources to ensure in order instruction completion. Instead, data processor 10 incorporates a first-in-first-out ("FIFO") store queue (FIG. 3) that allows efficient store completion. In particular, the disclosed store queue can be dynamically split in two to suit the particular instruction sequence. The first half contains data related to store instructions whose addresses have been translated but which are not ready to be presented to the memory system (not shown). These store instructions are "finished." The second half contains data related to instructions whose addresses have been translated and which are ready to be presented to the memory system. These store instructions are "completed." The second half of the store queue may be further divided into a portion whose store addresses are presented to, and either found in or not found in, the memory cache. These store instructions are "attempted and invalid" and "attempted," respectively. The disclosed store queue also allows the load store unit of which it is a part to continue presenting store addresses to the memory cache after an initial miss. Data processor 10 therefore implements a "non-blocking cache."

Continuing with FIG. 1, a bus interface unit (hereafter BIU) 12 controls the flow of data between data processor 10 and the remainder of a data processing system (not depicted). BIU 12 is connected to an instruction cache 14 and to a data cache 16. Instruction cache 14 supplies an instruction stream to a sequencer unit 18. Sequencer unit 18 forwards individual instructions to an appropriate execution unit. Data processor 10 has a branch unit 20, a fixed point execution unit A 22, a fixed point execution unit B 24, a complex fixed point execution unit 26, a load/store execution unit 28, and a floating point execution unit 30. Fixed point execution unit A 22, fixed point execution unit B 24, complex fixed point execution unit 26, and load/store execution unit 28 read and write their results to a general purpose architectural register file 32, (labeled GPRs and hereafter GPR file) and to a first rename buffer 34. First rename buffer 34 is more fully described below in connection with FIGS. 3 and 4. Floating point execution unit 26 and load/store execution unit 28 read and write their results to a floating point architectural register file 36, (labeled FPRs and hereafter FPR file) and to a second rename buffer 38.

The operation of data processor 10 without the disclosed invention is known in the art. In general, branch unit 20 determines what sequence of programmed instructions is appropriate given the contents of certain data registers and the instructions themselves. Instruction cache 14 provides this sequence of programmed instructions to sequencer 18. If instruction cache 14 does not contain the required instructions, then it will fetch them from a main memory system external to data processor 10 (not shown).

Sequencer unit 18 issues the individual instructions of the sequence of programmed instructions to the various execution units 20, 22, 24, 26, 28 and 30. Each of the execution units performs one or more instructions of a particular class of instructions. The particular class of instructions of each execution unit is indicated by the name of the execution unit. For instance, fixed point execution units A and B perform simple mathematical operations on operands expressed in fixed point notation such as addition, subtraction, ANDing, ORing and XORing. Complex fixed point execution unit 26 performs more complex mathematical operations on operands expressed in fixed point notation such as multiplication and division. Floating point execution unit 30 performs mathematical operations on operands expressed in floating point notation such as multiplication and division.

Fixed point execution units A and B and complex fixed point unit 26 return the results of their operations to designated entries in first rename buffer 34. First rename buffer 34 periodically updates an entry of GPR file 32 with an entry from first rename buffer 34 when all instructions preceding the instruction that generated the result have updated their GPR file entries. Sequencer unit 18 coordinates this updating. Both first rename buffer 34 and GPR file 32 can supply operands to fixed point execution units A and B and to complex fixed point unit 26.

Floating point execution unit 30 returns the results of its operations to designated entries in second rename buffer 38. Second rename buffer 38 periodically updates an entry of FPR file 36 with an entry in second rename buffer 38 when all instructions preceding the instruction that generated the result have updated their FPR file entries. Sequencer unit 18 also coordinates this updating. Both second rename buffer 38 and FPR file 36 supply operands to floating point execution unit 30.

Load/store unit 28 reads data stored in GPR file 32, or FPR file 36 at completion time and writes the selected data to data cache 16. This data may also be written to an external memory system (not depicted) depending upon operating characteristics of data processor 10 not relevant to the disclosed invention. Conversely, load/store unit 28 reads data stored in data cache 16 and writes the read data to first rename buffer 34 or second rename buffer 38. If data cache 16 does not contain the required data, then it will fetch it from the main memory system external to data processor 10 via BIU 12. Load/store unit 28 is described below in connection with FIGS. 3 through 14.

The operation of data processor 10 with the disclosed load/store unit 28 is described below in connection with FIGS. 3 through 14. In general, data processor 10 is a reduced instruction set computer ("RISC"). Data processor 10 achieves high performance by breaking each instruction into a sequence of smaller steps, each of which may be overlapped in time with steps of other instructions. This performance strategy is known as "pipe lining."

Figure 2:
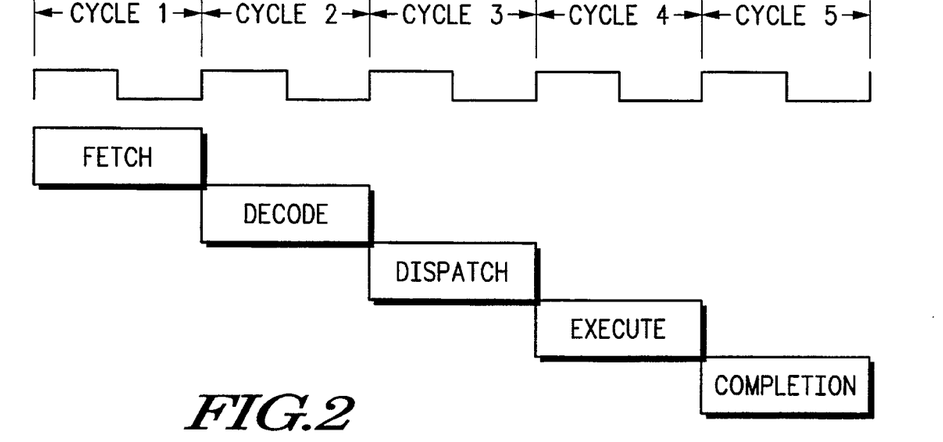
FIG. 2 depicts a timing diagram of an instruction executed by the data processor depicted in FIG. 1.

FIG. 2 depicts a timing diagram of an instruction executed by data processor 10 depicted in FIG. 1. In the depicted embodiment, each instruction is broken into five discrete steps: fetch, decode, dispatch, execute, and completion.

In the fetch stage, memory management circuitry (not shown) within instruction cache 14 retrieves one or more instructions beginning at a memory address identified by sequencer unit 18 or by branch unit 20 in the prior clock cycle.

In the decode stage, instructions are decoded by the sequencer unit 18 into a number of control signals for use by subsequent stages.

In the dispatch stage, sequencer unit 18 routes each instruction to the appropriate execution unit after determining that there are no impermissible data or resource dependencies and after reserving a rename buffer entry for the result of the instruction. The dispatch stage is also responsible for supplying operand information for the instructions being dispatched. Each one of the execution units stores its particular instruction in a reservation station until it receives all the necessary operand information to perform the instruction.

Figure 3:
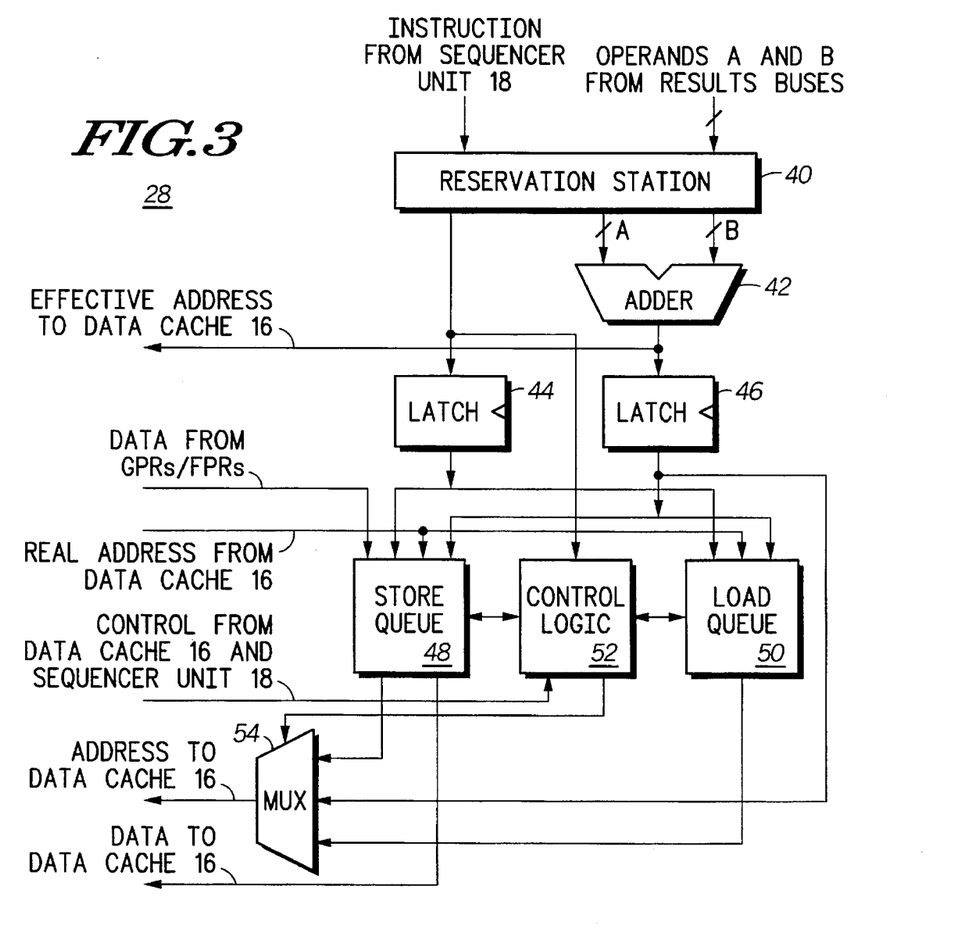
FIG. 3 depicts a block diagram of the load/store unit 28 depicted in FIG. 1.

In the execute stage, each particular execution unit receives all (or some) of the necessary operand information and is therefore able to begin performing its programmed instruction. Results, if any, are returned either to first rename buffer 34 or second rename buffer 38, respectively, for integer and floating point results. Load/store unit 28 calculates the effective address of the destination memory location according to the load/store instruction's operands and its format. Load/store unit 28 may move the instruction into a load or store queue (FIG. 3). Data cache 16 also begins translating the calculated effective address into a real address. Data processor 10 uses an effective address internally to index each possible memory location and a real address externally to index each possible memory location. Data processor 10 maintains a table of address translations (not shown) to convert from one format to the other format.

A store instruction may require one or more additional execute stages. If the store instruction is not able to immediately access data cache 16, then the store instruction will remain in the store buffer as described below.

In the completion stage, sequencer unit 18 updates the architectural register files with the result of a particular instruction stored in a rename buffer after every instruction preceding the particular instruction has so updated the architectural register file. The completion stage also updates all other architectural states in the machine after every instruction preceding the particular instruction has so updated the architectural state. Store instructions are presented to data cache 16 when all instructions preceding them have completed.

Generally, each instruction stage takes one machine clock cycle. However, some instructions, such as complex fixed point instructions, require more than one clock cycle to execute. Therefore, there may be a delay between the execution and completion stages of a particular instruction due to the range of times which previous instructions may have taken to execute.

FIG. 3 depicts a block diagram of load/store unit 28 depicted in FIG. 1. Load/store unit 28 has a reservation station 40. Reservation station 40 receives either a store instruction or a load instruction from sequencer unit 18 and two operands, A and B, from GPR file 32 or forwarded from the result buses connected to first rename buffer 34. Reservation station 40 forwards the two operands and the instruction to an adder 42 and to a latch 44, respectively. Adder 42 calculates an effective address of the load/destination of each load/store instruction by mathematically summing the two operands. The output of adder 42 is latched by a latch 46 and forwarded to data cache 16. Latches 44 and 46 are clocked by a global periodic clocking signal (not shown).

The instruction and effective address latched by latches 44 and 46 are forwarded to a store queue 48 and to a load queue 50. A control logic unit 52 selects which of the two queues latches the data depending upon the class of instruction. Control logic unit 52 receives the instruction opcode from reservation station 40 to facilitate this routing. Control logic unit 52 also receives various control signals from data cache 16 and from sequencer unit 18 labeled "CONTROL." Control logic unit 52 controls which of three inputs a multiplexer 54 outputs to data cache 16. Multiplexer 54 receives an address from latch 46, from store queue 48, and from load queue 50. The operation of control logic unit 52 is described below.

In operation, sequencer unit 18 forwards a load or a store instruction to load/store unit 28 during the instruction's dispatch stage. Reservation station 40 latches the instruction and one each of (a) either operand A or a tag identifying the destination in rename buffer 34 or in rename buffer 38 of operand A when some other execution unit completes it, and (b) either operand B or a tag identifying the destination in rename buffer 34 or in rename buffer 38 of operand B when some other execution unit completes it. Reservation station 40 waits until both operands are available.

The load/store instruction's execution phase begins when both operands are available. Adder 42 calculates the effective address of the source/destination. Latches 44 and 46 latch the instruction and the instruction's address, enabling reservation station 40 to accept another instruction.

Sequencer unit 18 asserts a control signal to control logic unit 52 when it has completed all instructions preceding the load or store instruction. This action may or may not cause the instruction to immediately complete depending upon the contents of data cache 16, of store queue 48, and of load queue 50. An instruction is complete when it can no longer generate an exception. This scheduling strategy eliminates the possibility of having to "undo" a load or store instruction if some prior instruction causes an exception. Sequencer unit 18 also supplies the data to be stored by the instruction to store queue 48 at this time if the instruction is a store instruction.

Other portions of data processor 10 perform functions related to the load/store instruction. Data cache 16 translates the effective address generated by adder 42 into a real address and determines if it contains the data associated with the load or store instruction. If data cache 16 is able to translate the effective address, then it returns the real address to load/store unit 28. If data cache 16 is not able to translate the effective address, then it accesses specialized address translation tables in the memory system (not shown.) Later, data cache 16 will generate an interrupt signal when this access is complete and it is able to supply the translation. Control logic unit 52 will then store the translated address in the entry associated with the un-translated load or store instruction. Simultaneously, data cache 16 determines if it contains the data indexed by the real address. If data cache 16 contains the data requested by a load instruction, then data cache 16 returns the data to load/store unit 28 during the following clock cycle. Data cache 16 does not modify its memory until sequencer unit 18 indicates that the store instruction is the oldest instruction in data processor 10. If data cache 16 does not contain the data indexed by the real address, then it will request it from the memory system via BIU 12 after control logic unit 52 indicates that the instruction requesting the data is the oldest instruction in data processor 10.

Control logic unit 52 forwards select instructions from store queue 48 and load queue 50 to data cache 16 via multiplexer 54. Both queues are first-in-first-out ("FIFO") queues. Control logic unit 52 maintains various pointers to identify which entry in each queue should receive the next instruction and which entry may be presented to data cache 16. As described above, control logic unit 52 presents a load instruction address to data cache 16 if both the load and a store instruction are eligible at the same time. Control logic unit 52 can "present" a store instruction to data cache 16 (or update the memory system with the instruction data) as soon as the following clock cycle in which store queue 48 latches the instruction under certain circumstances: (1) if the various pointers indicate that the instruction is the next instruction to be so presented, (2) if data cache 16 was able to translate the instruction's address in the previous clock cycle, and (3) if data cache 16 determines that it contains the indexed data. Otherwise, control logic unit 52 delays the presentation of the store instruction to data cache 16 for at least one additional clock cycle. In both cases, control logic unit 52 buffers the instruction in the next available entry in store queue 48. Control logic unit 52 presents a load instruction to data cache 16 as soon as adder 42 calculates the effective address of the instruction. If data cache 16 is able to translate the instruction's address, and if data cache 16 contains the indexed data, then the load instruction is considered fully executed. Otherwise, control logic unit 52 buffers the load instruction in the next available entry in load queue 50.

Continuing with FIG. 3, control logic unit 52 buffers store instructions in store queue 48. Store queue 48 is a six entry static random access memory ("SRAM") structure. Each of the six entries contains one hundred and thirty-eight bits: seventy bits storing a portion of the store instruction's opcode and data attributes, sixty-seven bits storing the store instruction's real address, and a valid bit indicating a valid real address field. Control logic unit 52 maintains four pointers for store queue 48: an OLDEST MISS pointer, a NEXT ACCESS pointer, a COMPLETE pointer, and a DISPATCH pointer. As will become apparent from the following description, the OLDEST MISS pointer is always behind or equal to the NEXT ACCESS pointer, the NEXT ACCESS pointer is always behind or equal to the COMPLETE pointer, and the COMPLETE pointer is always behind or equal to the DISPATCH pointer. Initially, all four pointers indicate the same entry in store queue 48.

Control logic unit 52 buffers each new store instruction in the entry indexed by the DISPATCH pointer. Control logic unit 52 stores the instruction's translated address in the same entry's real address field when data cache 16 provides it. Control logic unit 52 also increments or advances the DISPATCH pointer by one when it receives the real address.

As described above, sequencer unit 18 asserts a control signal and supplies the store data indicating that load/store unit 28 may complete a store instruction. Control logic unit 52 buffers the store data in the data field of the entry specified by the COMPLETE pointer. Control logic unit 52 also increments the COMPLETE pointer by one when it receives the store data.

Control logic unit 52 forwards the real address and store data of the instruction indexed by the NEXT ACCESS pointer to data cache 16 when it has no higher priority load instructions. Control logic unit 52 increments the NEXT ACCESS pointer by one. If the access is successful, then data cache 16 modifies the contents of the appropriate memory location and control logic unit 52 invalidates the entry's valid bit. If the access is not successful, then load/store unit 28 must wait for data cache 16 and BIU 12 to retrieve the data from the external memory system. Data cache 16 asserts a control signal when it receives valid data from the external memory system. Control logic unit 52 then re-presents the address indexed by the OLDEST MISS pointer to data cache 16. It should be understood that control logic unit 52 will continue to present the store instruction indexed by the NEXT ACCESS pointer to data cache 16 after a miss. These subsequent presentations may or may not "hit" in data cache 16.

Finally, control logic unit 52 increments the OLDEST MISS pointer to the next valid entry or to the DISPATCH POINTER if there are no other valid entries when the entry currently indexed by the current entry becomes invalid.

Control logic unit 52 buffers load instructions in load queue 50. Load queue 50 is a four entry SRAM structure. Each of the four entries contains sixty-five bits: thirty-two bits storing a portion of the load instruction's opcode and data attributes, thirty-two bits storing the load instruction's real address, and a valid bit indicating a valid real address field. Control logic unit 52 maintains two pointers for load queue 50: a HEAD pointer and a TAIL pointer. As will become apparent from the following description, the HEAD pointer is always behind or equal to the TAIL pointer. Initially, both pointers indicate the same entry in load queue 50.

Load/store unit 28 forwards each load instruction directly to data cache 16 after adder 42 generates the load instruction's effective address. This scheduling reflects the priority of load instructions relative to store instructions. If data cache 16 is able to translate the effective address into a real address and if data cache 16 contains the requested data, then data cache 16 forwards the data to rename buffer 34 or 38. If data cache 16 is not able to translate the address, then the load instruction waits in latches 44 and 46 until data cache 16 can so translate the address. If data cache 16 does not contain the data, then control logic unit 52 stores the load instruction in the entry indexed by the TAIL pointer. In the depicted embodiment, data cache 16 does not request the load instruction data from the external memory system until sequencer unit 18 indicates that all instructions preceding the load instruction have written back their results to the various architectural registers of data processor 10. This strategy avoids speculative data load operations to the external memory system. Control logic unit 52 increments the TAIL pointer by one when it receives the real address. Control logic unit 52 also sets the valid bit of the entry indicating a valid real address field.

As described above, sequencer unit 18 asserts a control signal indicating that load/store unit 28 may complete a load instruction. Control logic unit 52 forwards the real address of the load instruction indexed by the HEAD pointer to data cache 16. If data cache 16 is able to supply the requested data, then data cache 16 forwards the data to the result buses via load/store unit 28, control logic unit 52 increments the HEAD pointer by one, and control logic unit 52 clears the instruction's valid bit. If data cache 16 is not able to supply the requested data, then load/store unit 28 must wait for data cache 16 and BIU 12 to retrieve the data from the external memory system. Data cache 16 directly forwards the received data to the appropriate result bus via load/store unit 28 and asserts a control signal to control logic unit 52. Control logic unit 52 then increments the HEAD pointer.

Figure 4:
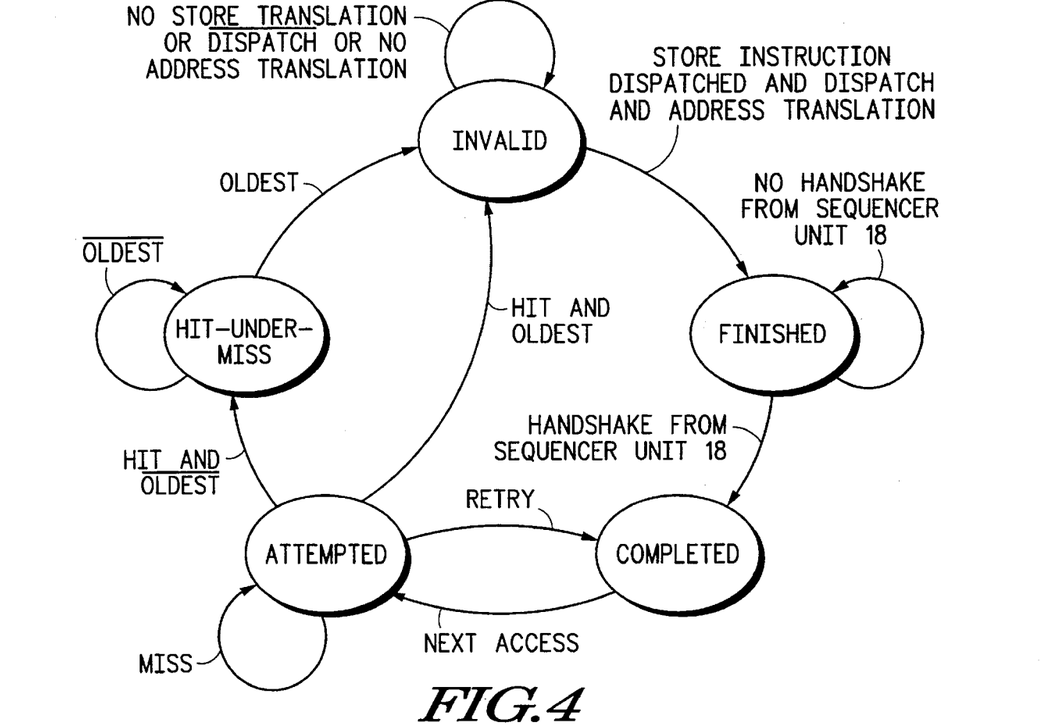
FIG. 4 depicts a state-transition diagram illustrating the possible states in which each entry of the store queue depicted in FIG. 3 may be.

FIG. 4 depicts a state-transition diagram illustrating the possible states in which each entry of store queue 48 depicted in FIG. 3 may be. Each of the six entries in store queue 48 may be in one and only one of the five depicted states: INVALID, FINISHED, COMPLETED, ATTEMPTED or HIT-UNDER-MISS. The particular values of the four store pointers, OLDEST MISS, NEXT ACCESS, COMPLETE, and DISPATCH, each entries' valid bit, and the operation of data processor 10 determine in which state the entry is.

Each of the six entries in store queue 48 is initially in an INVALID state. Each entry between the OLDEST MISS pointer up to and including the DISPATCH pointer is in the INVALID state. Eventually, sequencer unit 18 dispatches enough store instructions to load/store unit 28 to cause the DISPATCH pointer to index the particular entry. Control logic unit 52 then buffers the next store instruction dispatched to load/store unit 18 in the entry. Data cache 16 translates the particular entry's effective address into a real address and forwards this address to load/store unit 28. Control logic unit 52 sets the particular entry's valid bit upon receipt of the translated address. The state of this particular entry then transitions from the INVALID STATE to the FINISHED state. The particular entry remains in this state until sequencer unit 18 indicates that the store instruction stored in the entry is the oldest instruction in data processor 10. Each entry between the DISPATCH pointer up to and including the COMPLETE pointer is in the FINISHED state.

Eventually, sequencer unit 18 signals to control logic unit 52 that the store instruction stored in the entry indicated by the COMPLETE pointer is the oldest instruction in data processor 10. At this point, every instruction that preceded the store instruction in the program order has updated the appropriate architectural register or, if no update is required, has reached a point in its operation after which it can not generate an exception. It is now safe to write data to the external memory system without threat of having to "undo" the store instruction. The state of this particular entry transitions from the FINISHED state to the COMPLETED state. Each entry between the COMPLETE pointer up to and including the NEXT ACCESS pointer is in the COMPLETED state.

Control logic unit 52 presents a store address-data pair to data cache 16 when the NEXT ACCESS pointer indexes the entry containing the store address-data pair and there are no higher priority operations. At this point, the particular entry transitions to the ATTEMPTED state. The state of the entry may return to the COMPLETED state if data cache 16 asserts the control signal RETRY. Data cache 16 asserts the control signal RETRY when it is unable to service store instructions because, for instance, data cache 16 receives data from BIU 12, data cache 16 accesses specialized address translation tables, etc. Each entry, whose valid bit is set, between the NEXT ACCESS pointer up to and including the OLDEST MISS pointer is in the ATTEMPTED state.

There are two possible results after control logic unit 52 presents a store address-data pair to data cache 16. Data cache 16 either contains the data, a "hit," or does not contain the data, a "miss."

In the data cache hit case, the entry transitions to either the HIT-UNDER-MISS state or the INVALID state. The entry transitions to the HIT-UNDER-MISS state if the OLDEST MISS pointer does not identify it as the oldest valid store instruction. Conversely, the entry transitions to the INVALID state if the OLDEST MISS does identify it as the oldest valid store instruction. In both cases, control logic unit 52 clears the entry's valid bit. Each entry, whose valid bit is cleared, between the COMPLETE pointer up to the OLDEST MISS pointer is in the HIT-UNDER-MISS state.

In the data cache miss case, the particular entry containing the presented store address-data pair remains in the ATTEMPTED state.

A particular entry remains in the HIT-UNDER-MISS state so long as the OLDEST MISS pointer does not identify it as the oldest valid store instruction. The entry transitions to the INVALID state when OLDEST MISS pointer identifies it as the oldest valid store instruction.

Figure 5:
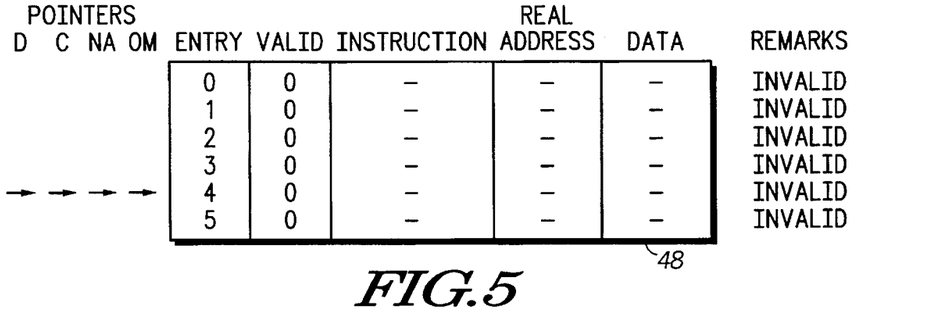
FIGS. 5 through 14 depict an example of the operation of the store queue depicted in FIG. 3.

FIGS. 5 through 14 depict an example of the operation of store queue 48 depicted in FIG. 3. In FIG. 5, store queue 48 is empty, all valid bits are cleared, and each entry is in the INVALID state. This configuration is typical after a reset condition occurs in data processor 10 or after a period of few store instructions. All four pointers specify the fourth entry of store queue 48.

Figure 6:
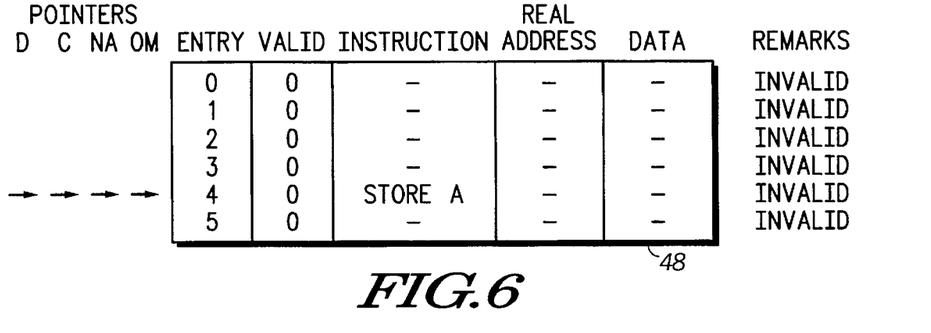

In FIG. 6, sequencer unit 18 dispatches a first store instruction ("STORE A") to load store unit 28. Control unit 52 writes this instruction into the entry identified by the DISPATCH pointer when it receives the instruction's operands. Simultaneously, adder 42 calculates the instruction's effective address and forwards the sum to data cache 16. In the depicted example, data cache 16 does not contain the effective-to-real address translation. Therefore, data cache 16 can not immediately return the instruction's real address. The fourth entry remains in the INVALID state.

Figure 7:
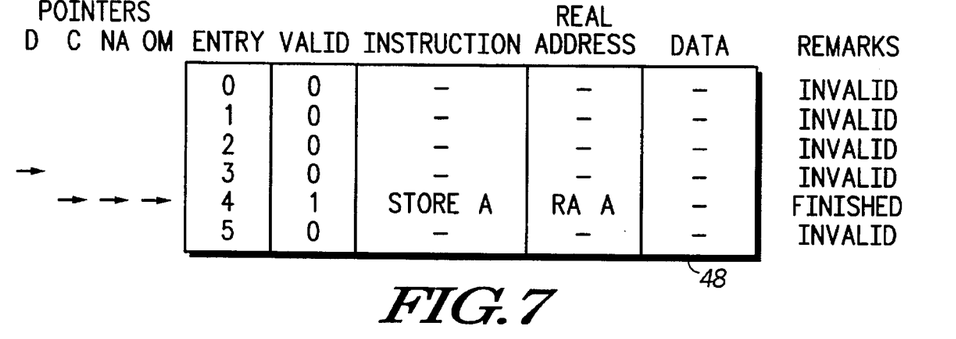

In FIG. 7, data cache 16 returns the instruction's real address ("RA A") to load store unit 28. Control unit 52 writes this real address into the entry specified by the DISPATCH pointer, the fourth entry. Control unit 52 also sets the valid bit of the fourth entry. The fourth entry is now in the FINISHED state. Control logic unit 52 advances the DISPATCH pointer.

Figure 8:
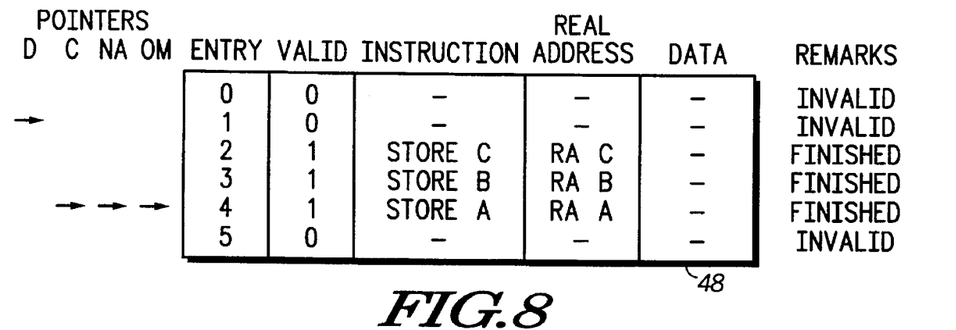

FIG. 8 depicts store queue 48 after sequencer unit 18 dispatches a second and third store instruction ("STORE B" and "STORE C," respectively) to it and after data cache 16 returns the two instructions' real addresses ("RA B" and "RA C," respectively). The sequence of events associated with each of the second and third store instructions is described above in connection with FIG. 6 and 7. The second and third entries are also in the FINISHED state. Control logic unit 52 advances the DISPATCH pointer two entries.

Figure 9:
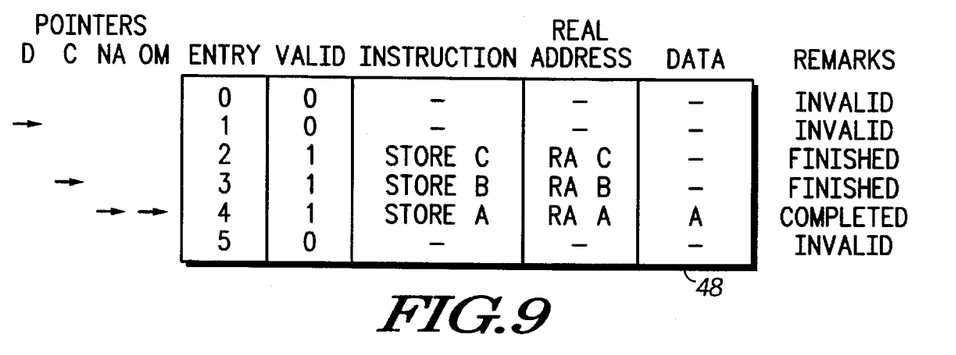

In FIG. 9, sequencer unit 18 signals to control logic unit 52 that the STORE A instruction is the oldest instruction in data processor 10. Sequencer unit 18 also supplies the data associated with the STORE A instruction ("A") to load/store unit 28. Control logic unit 52 stores this data in the entry identified by the COMPLETE pointer. In the depicted example, BIU 12 or data cache 16 is not able to service the STORE A instruction. Therefore, the fourth entry transitions only to the COMPLETED state. Control logic unit 52 advances the COMPLETE pointer.

Figure 10:
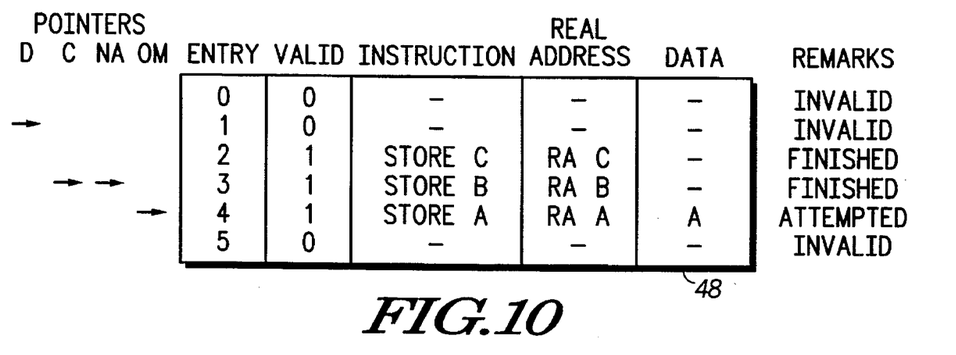

In FIG. 10, control logic unit 52 presents the store address-data pair identified by the NEXT ACCESS pointer, the fourth entry, to data cache 16 because it has no higher priority operations. In the depicted example, data cache 16 does not contain the necessary data, a cache "miss." (For memory coherency purposes, the store destination line must be present in data cache 16 before it can be modified by a store instruction.) Therefore, the fourth entry transitions to the ATTEMPTED state. Control logic unit 52 advances the NEXT ACCESS pointer.

Figure 11:
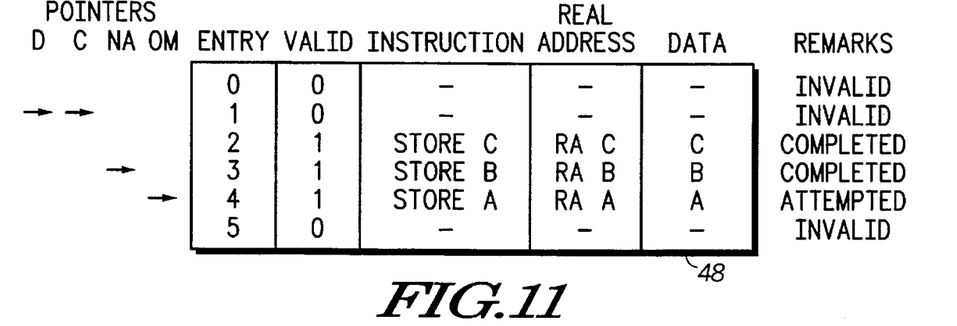

In FIG. 11, sequencer unit 18 signals to control logic unit 52 that the STORE B and STORE C instructions are the oldest instructions in data processor 10 (separately, over two or more machine cycles). Sequencer unit 18 also supplies the data associated with the STORE B and STORE C instructions ("B" and "C," respectively) to load/store unit 28. Control logic unit 52 stores this data in the entry identified by the COMPLETE pointer. Therefore, the second and third entries transition to the COMPLETED state. Control logic unit 52 advances the COMPLETE pointer two entries.

Figure 12:
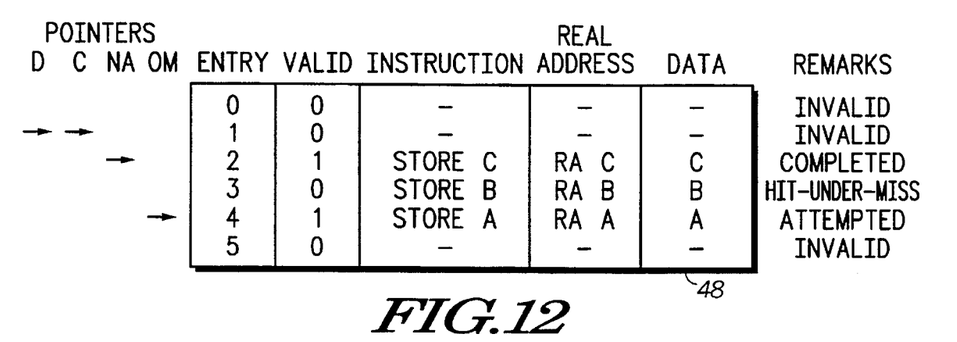

In FIG. 12, control logic unit 52 presents the store address-data pair identified by the NEXT ACCESS pointer, the third entry, to data cache 16 because it has no higher priority operations. In the depicted example, data cache 16 contains the necessary data, a cache "hit." Control logic unit 52 also clears the valid bit of the successfully presented store address-data pair. For purposes of load/store unit 28, no further action is necessary with respect to the STORE B instruction. However, an older store instruction has not yet been successfully presented to data cache 16. Therefore, the third entry transitions to the HIT-UNDER-MISS state. Control logic unit 52 advances the NEXT ACCESS pointer. It should be noted that a previous cache miss did not prevent the successful operation of the second store instruction.

Figure 13:
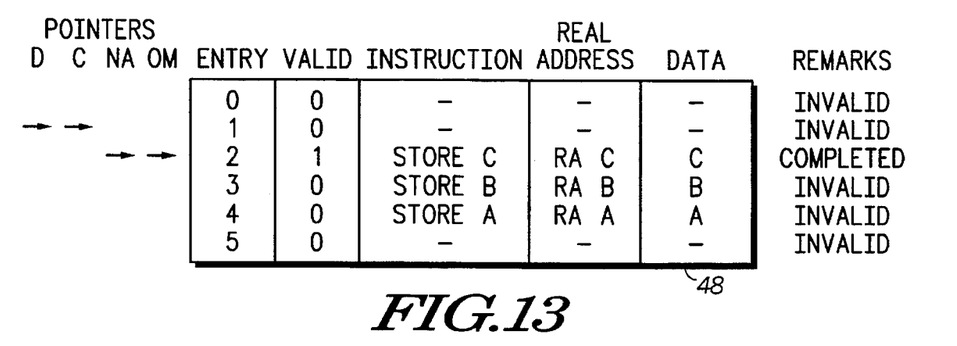

In FIG. 13, data cache 16 indicates to load/store unit 28 that it has received new data. Control logic unit 52 then re-presents the oldest outstanding store address-data pair to data cache 16 because it has no higher priority operations. In the depicted example, the oldest outstanding store address-data pair is stored in the fourth entry. By definition, data cache 16 contains the necessary data, a cache "hit." Therefore, the fourth entry transitions to the INVALID state. The third entry also transitions to the INVALID state because no older instruction remains outstanding. Control logic unit 52 advances the OLDEST MISS pointer two entries.

Figure 14:
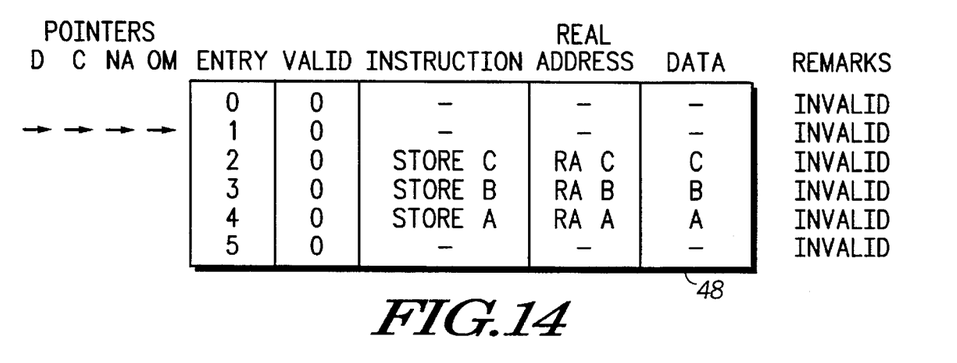

In FIG. 14, control logic unit 52 presents the store address-data pair identified by the NEXT ACCESS pointer, the second entry, to data cache 16 because it has no higher priority operations. In the depicted example, data cache 16 contains the necessary data, a cache "hit." Therefore, the second entry can transition directly to the INVALID state. Control logic unit 52 advances the NEXT ACCESS and OLDEST MISS pointers.

Although the present invention has been described with reference to a specific embodiment, further modifications and improvements will occur to those skilled in the art. For instance, the disclosed invention may be incorporated into data processors traditionally classified as complex instruction set computers or CISC machines. Also, certain functional units may be omitted in certain embodiments or relocated to other areas of data processor 10. It is to be understood therefore, that the invention encompasses all such modifications that do not depart from the spirit and scope of the invention as defined in the appended claims.

What is claimed is:

1. A store queue for use in a data processor with a memory cache, the memory cache storing a subset of data stored in a memory storage system, the data processor executing a plurality of store instructions, each one of the plurality of store instructions writing one of a plurality of data to a location in the memory storage system, the store queue comprising:

a write first-in-first-out ("FIFO") queue comprising a plurality of entries, each one of the plurality of entries storing one of a plurality of store instructions executed by the data processor;

means for maintaining a valid state or an invalid state of each one of the plurality of the entries; and control circuitry coupled to the write FIFO queue, the control circuitry comprising a first pointer, a second pointer, and a third pointer, the first pointer, the second pointer, and the third pointer indexing an entry in the write FIFO queue, the control circuitry storing each one of the plurality of store instructions in the entry indexed by the first pointer, the control circuitry incrementing the first pointer responsive to storing each one of the plurality of store instructions in the write FIFO queue, the control circuitry incrementing the second pointer responsive to presenting the one of the plurality of store instructions stored in the one of the plurality of entries indexed by the second pointer to the memory cache, the control circuitry invalidating the one of the plurality of entries indexed by the second pointer if the data accessed is present in the memory cache, the control circuitry continuing to present ones of the plurality of store instructions to the memory cache after a miss to the memory cache, the control circuitry incrementing the third pointer responsive (1) to presenting the one of the plurality of store instructions stored in the one of the plurality of entries indexed by the third pointer to the memory system, or (2) to determining that the one of the plurality of store instructions stored in the one of the plurality of entries indexed by the third pointer is in the invalid state and thereby not presenting the one to the memory system.

2. The store queue of claim 1 further comprising:

a read first-in-first-out ("FIFO") queue comprising a plurality of entries, each one of the plurality of entries storing one of a plurality of load instructions; and wherein the control circuitry further comprises a head pointer and a tail pointer indexing an entry in the read FIFO queue, the control circuitry storing each one of the plurality of load instructions in the entry indexed by the tail pointer, the control circuitry incrementing the tail pointer responsive to storing each one of the plurality of load instructions, and the control circuitry incrementing the head pointer responsive to presenting the one of the plurality of load instructions stored in the one of the plurality of entries indexed by the head pointer to the memory cache.

3. The store queue of claim 2 wherein the control circuitry further comprises a fourth pointer indexing an entry in the FIFO queue, the control circuitry (1) storing data associated with one of the plurality of store instructions in the entry indexed by the fourth pointer and (2) incrementing the fourth pointer.

4. The store queue of claim 3 wherein the control circuitry stores data associated with one of the plurality of store instructions in the entry indexed by the fourth pointer when all instructions preceding the store instruction indexed by the fourth pointer have completed.

5. The store queue of claim, 1 wherein the control circuitry further comprises a fourth pointer indexing an entry in the FIFO queue, the control circuitry (1) storing data associated with one of the plurality of store instructions in the entry indexed by the fourth pointer and (2) incrementing the fourth pointer.

6. The store queue of claim 5 wherein the control circuitry stores data associated with one of the plurality of store instructions in the entry indexed by the fourth pointer when all instructions preceding the store instruction indexed by the fourth pointer have completed.

\* \* \* \* \*